Figure 1:
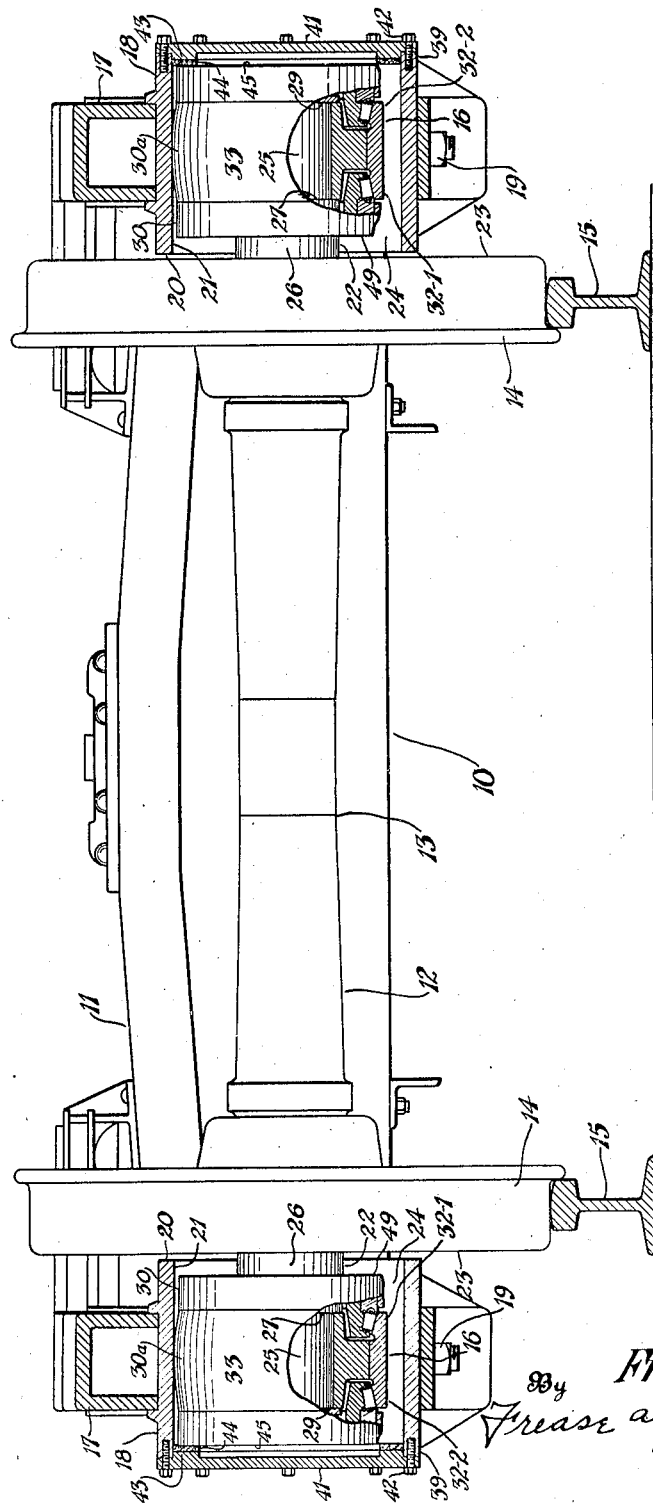

Oct. 24, 1933.   F. TYSON   1,932,236
ANTIFRICTION BEARING APPARATUS
Filed April 1, 1932   4 Sheets-Sheet 4

Inventor
Frank Tyson
By
Freast and Bishop
Attorneys

Patented Oct. 24, 1933

1,932,236

UNITED STATES PATENT OFFICE 1,932,236

ANTIFRICTION BEARING APPARATUS

Frank Tyson, Canton, Ohio

Application April 1, 1932. Serial No. 602,475

7 Claims. (Cl. 308—180)

My invention relates to anti-friction bearing apparatus, particularly adapted for use on railway cars and the like.

Anti-friction bearings as heretofore applied to railway cars and the like have not been generally satisfactory for many reasons, the more important of which are as follows:

First, unusual difficulty has been encountered in introducing usual forms of anti-friction bearings into usual forms of railway car construction, without materially changing standard parts of the cars.

Second, from the standpoint of maintenance, and making repairs en route, no anti-friction bearing application on railway cars and the like has heretofore been available, in which the anti-friction bearing can be replaced as easily in case of failure, or lack of lubricant, as can the usual and ordinary type of half box bearing heretofore generally employed on railway cars and the like.

Third, the transmission of loads from the car to the car wheel axle in usual applications of anti-friction bearings to railway cars has been heretofore attained by securing the outer raceway member of the anti-friction bearing stationary with respect to the inner raceway member and transmitting the load to the outer member, by securing the inner raceway member on the rotating car wheel shaft, and by interposing the rolling members between the stationary outer raceway member and the rotating inner raceway member, whereby in use the rolling members have to roll up hill over the inner raceway member and against the action of gravity and against a wedging action caused by deflection of the outer raceway member due to the applied load.

In other words, in the usual application of anti-friction bearings to railway cars each rolling member must not only withstand the compression load applied thereto and at the same time roll, but each rolling member must also actually bodily lift the load as it rolls over the top of the inner raceway, by reason of the aforesaid deflection of the outer raceway member, which may be otherwise described as a displacement of the outer raceway member out of center with respect to the axis of rotation of the axle.

The objects of the present invention include the provision of improved anti-friction bearing apparatus adapted to overcome the foregoing difficulties, whereby the improved apparatus may be applied to usual forms of railway cars without materially changing standard parts of the cars, whereby the improved anti-friction bearing of the apparatus may be easily and quickly installed and replaced, and whereby an improved transmission of loads between the members of the anti-friction bearing is effected.

The foregoing and other objects are attained by the improvements, apparatus, parts, combinations, and sub-combinations, which comprise the present invention, and the nature of which is set forth in the following general statement, and preferred embodiments of which, together with their mode of use, are set forth in the following description, and which are particularly and distinctly pointed out and set forth in the appended claims forming part hereof.

The nature of the improved anti-friction bearing apparatus of the present invention may be stated in general terms as including a load transmitting member, an anti-friction bearing, and a load supporting rotatable shaft, the anti-friction bearing including an outer raceway member having an inwardly facing raceway formed therein, an inner raceway member having an outwardly facing raceway formed thereon, and rolling members interposed and rolling between the raceways, and the load transmitting member being engaged with the inner raceway member, and the outer raceway member being secured on the shaft.

Figure 2:
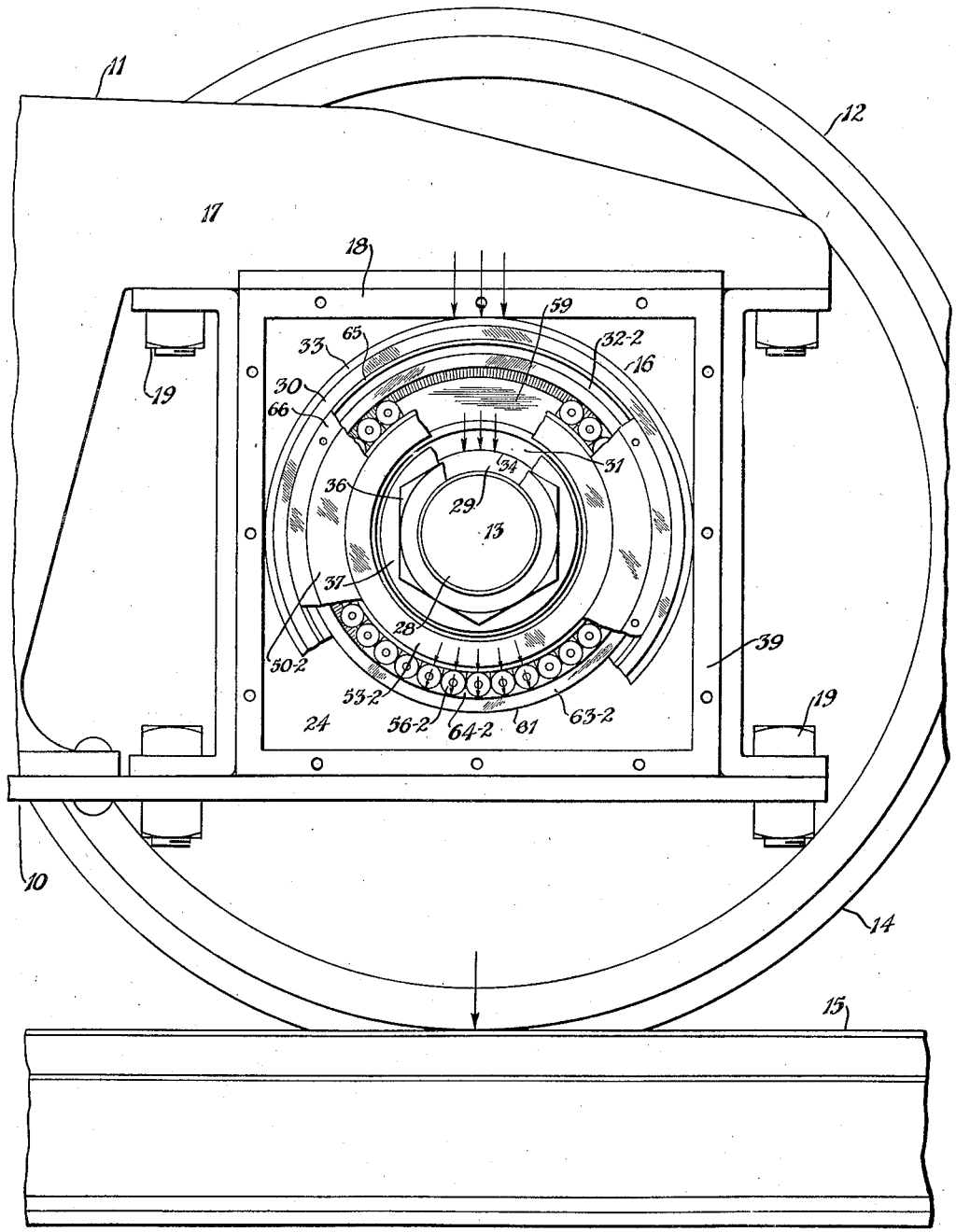
Figure 3:
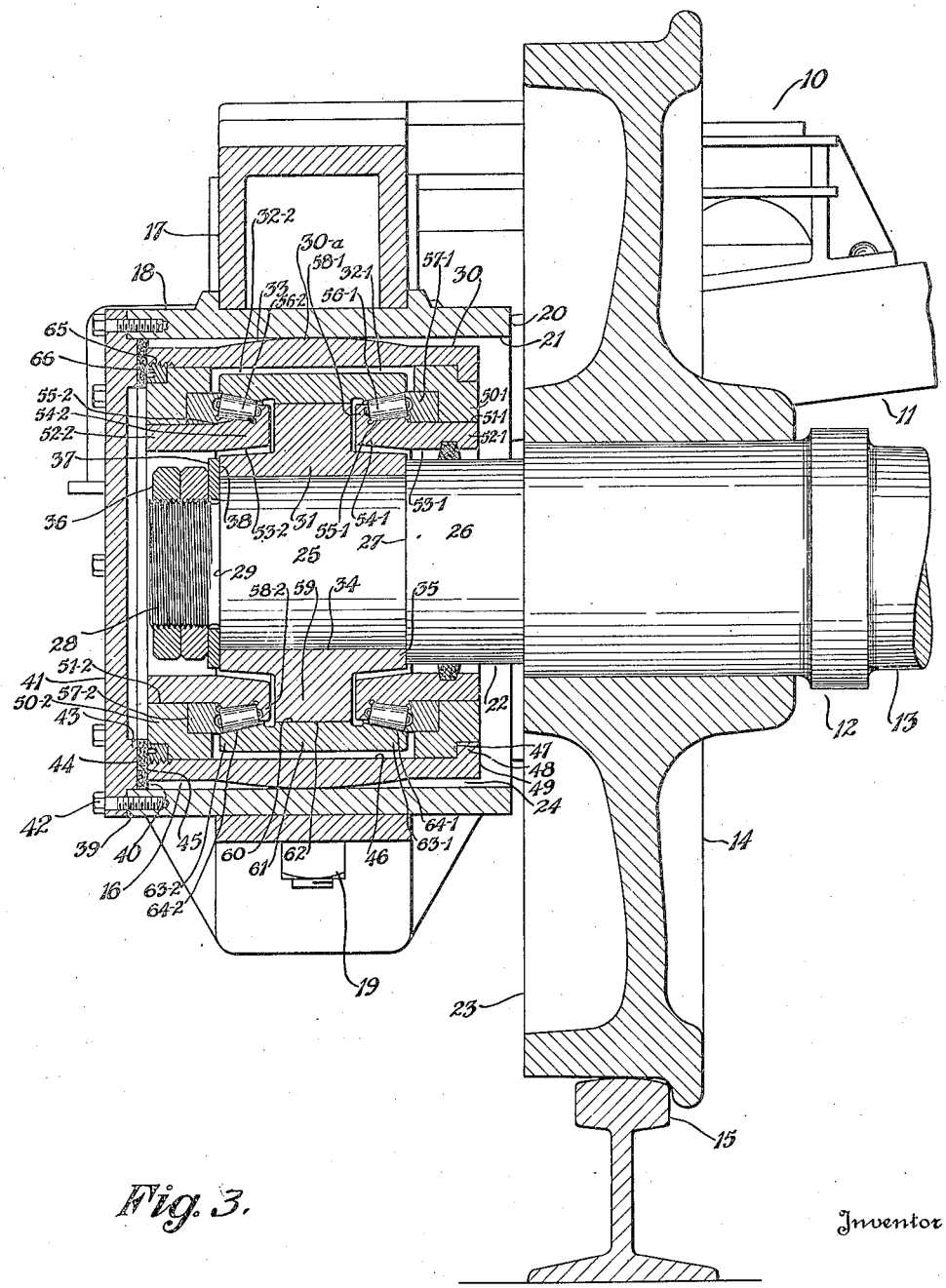
Figure 4:
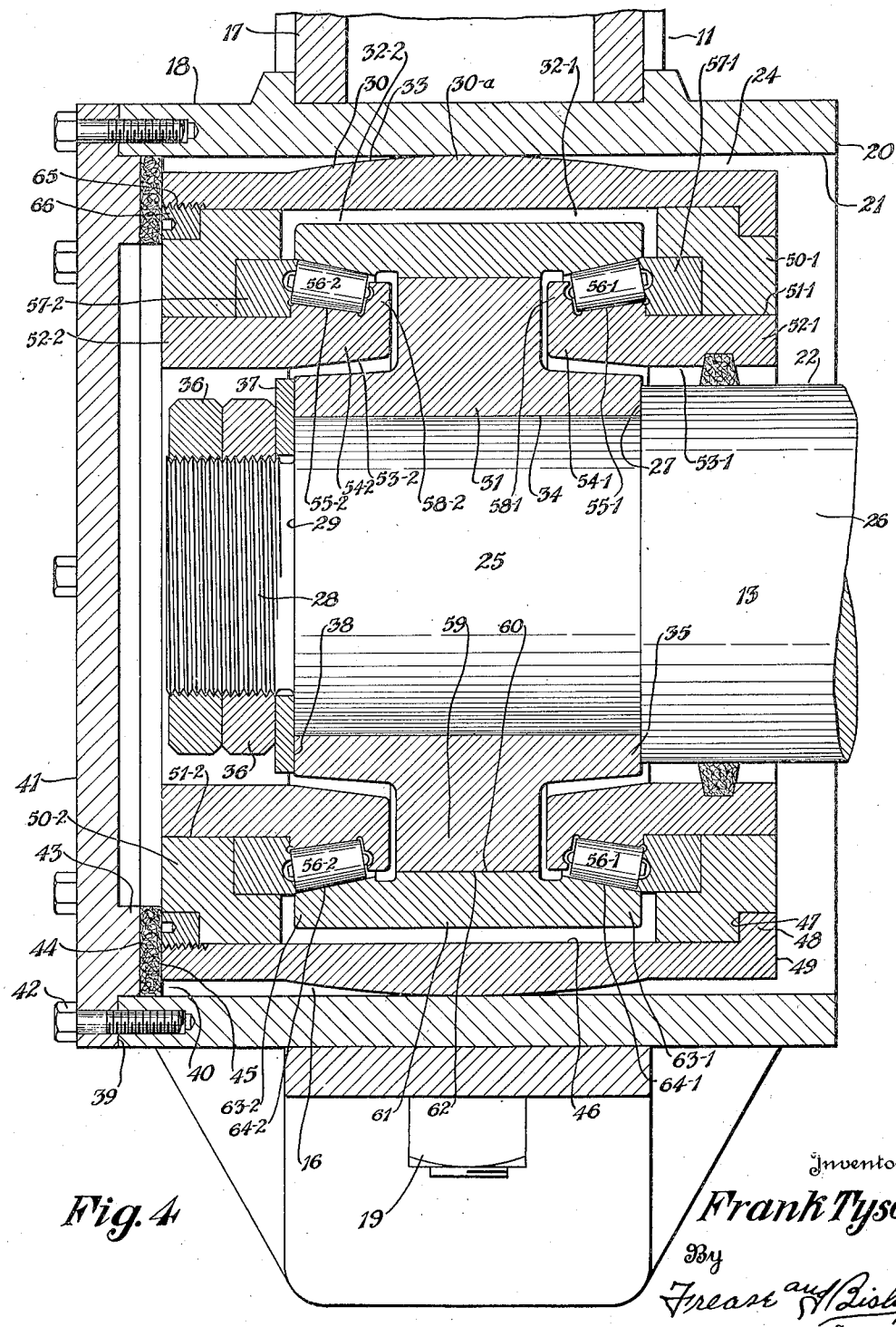

Preferred embodiments of the improved apparatus are illustrated in the accompanying drawings forming part hereof, in which Figure 1 is an end elevation view with portions broken away and in section, illustrating a railway car truck including the present improvements;

Fig. 2, an enlarged fragmentary side elevation view thereof, with portions broken away and in section;

Fig. 3, a fragmentary vertical sectional view thereof as on line 3—3, Fig. 1; and Fig. 4, an enlarged fragmentary view of portions of Fig. 2 for more clearly illustrating details of construction of the improvements.

Similar numerals refer to similar parts throughout the several views.

A railway car truck, in which the present improvements are embodied, is indicated generally by 10, and includes members comprising a usual load transmitting truck frame indicated generally by 11 in which is operatively mounted by the use of the present improvements, a plurality of sets of load supporting wheels and axles, one of which is illustrated in the drawings, and is indicated generally by 12.

Each set of wheels and axles 12 includes an axle 13 adjacent each end of which a usual wheel 14 is mounted in a usual manner as by means of a press fit, and each wheel 14 rolls in a usual manner on one of the rails 15 of a usual railway track.

One of the improved anti-friction bearing units of the present invention, each indicated generally by 16, is operatively positioned in a novel manner between each end of the axle 13 and one of the load sustaining members 17 of the frame 11.

For this purpose, a rectangular tubular housing or box indicated generally by 18 may be secured to each load sustaining frame member 17, as by means of bolts and nuts 19.

The inner end 20 of each box 18, opposite the adjacent wheel 14, is provided with an opening 21; and an end portion of the axle indicated generally by 22 extends beyond the opposite outer face 23 of the adjacent wheel 14 and through the opening 21 into the interior 24 of each box 18.

Each end portion 22 of the axle 13 preferably includes an inner bearing sleeve seat portion 25 which is preferably cylindrical as illustrated, and which preferably has a diameter less than the diameter of the axle portion 26 located between the particular seat portion 25 and the adjacent wheel 14, whereby an outwardly extending shoulder 27 is provided at the inner end of each seat portion 25.

Each axle end portion 22 also preferably includes beyond the outer end of its seat portion 25, a threaded portion 28, and the diameter of the threaded portion 28 is preferably less than the diameter of the adjacent seat portion 25, thereby forming an outwardly extending shoulder 29 between each threaded portion 28 and the adjacent seat portion 25.

Each improved anti-friction bearing unit 16 includes an outer tubular member or sleeve 30, an inner tubular member or sleeve 31, and members forming a plurality of anti-friction bearings indicated generally by 32—1 and 32—2, and each operatively mounted between the sleeves 30 and 31.

The central portion 30a of each outer sleeve 30 has preferably a spherical outer surface 33 which fits within and is engaged by inner surfaces of the box 21 mounting the particular unit 16, and whereby each unit 16 may rock in its mounting box 21.

Each inner collar member or sleeve 31 is provided with a bore 34, which is adapted for interchangeably fitting on the seat portion 25 on either end of any of the preferably standardized and similar axles 13.

When one of the sleeves 31 is fitted on one of the seat portions 25, the inner end 35 of the fitted sleeve 31 abuts against the shoulder 27 of its mounting axle end portion 22; and each sleeve 31 is secured on its mounting axle end portion 22, as by means of nuts 36 screwed on the threaded portion 28 of the particular axle end portion 22, and a thrust washer 37 is preferably interposed between each inner nut 36 and the outer end 38 of the sleeve 31 being thus secured on the particular axle end portion 22.

By this construction and arrangement, the improved bearing unit 16 may be easily mounted upon or removed from any desired axle end portion 22.

The outer end 39 of each box 18 is provided with an opening 40, and a removable closure and thrust member 41 is preferably secured on the outer end 39 of each box and across the opening 40 thereof, as by means of cap screws 42, the shank of each of which extends through a suitable aperture formed in the closure member 41 being secured thereby, and each shank is screwed into a suitable threaded bore formed in the outer end 39 of the box 18 mounting the particular closure member 41, with the head of each cap screw 42 clamping against the outer face of the closure member 41 in the usual manner.

An annular thrust rib 43 may be formed on the inner face of each closure member 41 and a resilient ring member 44 may be interposed between the thrust rib 43 and the adjacent outer end 45 of the bearing unit 16 mounted in the particular box 18.

Each of the anti-friction bearings 32—1 or 32—2 of each unit 16 may be described generally as including an outer raceway member having an inwardly facing raceway formed therein, an inner raceway member having an outwardly facing raceway formed thereon, and rolling members interposed and rolling between the raceways, each inner raceway member being mounted or secured on the outer sleeve 30 of the unit, which is itself mounted in one of the boxes 18, and each outer raceway member being mounted on the inner sleeve 31 of the unit which is itself mounted on the axle end portions 22 located within the particular box.

In each unit 16 as illustrated, the outer sleeve 30 has preferably formed therein a cylindrical bore 46 extending from the outer end 45 of the unit to an inner annular stop shoulder 47 comprising one face of an inwardly extending annular flange 48 formed on the inner end 49 of the sleeve.

An inner spacer ring 50—1 fits within each bore 46, and abuts against the stop shoulder 47 of the bore.

Each inner spacer ring 50—1 is provided with an inner bore 51—1 which receives, fits, and mounts one end 52—1 of a tubular inner raceway member indicated generally by 53—1.

The other end 54—1 of each inner raceway member 53—1 extends beyond the adjacent end of its spacer and mounting ring 50—1, and each inner raceway member end 54—1 has an outwardly facing raceway surface 55—1 formed thereon, which as illustrated is frusto-conical for use in conjunction with tapered or frusto-conical rolling members 56—1, with the large end of the frusto-conical raceway surface 55—1 being located nearest the spacing and mounting ring 50—1.

A thrust ring 57—1 may be interposed between the large end of each raceway surface 55—1 and the spacing and mounting collar 50—1, each thrust ring 57—1 being adapted for resisting the thrust of the large ends of the tapered rolling members 56—1.

A rolling member retaining shoulder 58—1 is preferably provided on each inner raceway member end 54—1, each shoulder 58—1 extending outwardly from the smaller end of the outwardly facing frusto-conical raceway surface 55—1 formed on the particular inner raceway member 53—1.

Each inner sleeve 31 as illustrated has formed thereon a central outwardly extending mounting flange 59, having an outer cylindric surface 60 which mounts an outer raceway tube 61.

The bore of each outer raceway tube includes a central cylindric portion 62 which as illustrated is press fitted on the outer cylindric surface 60 of its sleeve mounting flange 59.

One end 63—1 of each tube 61 extends beyond one end of its mounting flange 59 and about the inner raceway member end 54—1, of the particular unit 16. Each tube end 63—1 comprises an outer raceway member for the bearing 32—1 of the particular unit, and has an inwardly facing frusto-conical raceway surface 64—1 formed in its bore, and the tapered rolling members 56—1 of each bearing 32—1 are interposed between and roll on the inwardly facing raceway surface 64—1 of its outer raceway member 63—1 and the outwardly facing raceway surface 55—1 of its inner raceway member 53—1.

The other end 63—2 of each tube 61 extends beyond the other end of its mounting flange 59 and comprises an outer raceway member for the bearing 32—2 of the particular unit, and has an inwardly facing frusto-conical raceway surface 64—2 formed in its bore.

An outer spacer and mounting ring 50—2 fits within each bore 46, and is provided with an inner bore 51—2 which receives, fits, and mounts one end 52—2 of a tubular inner raceway member indicated generally by 53—2.

The other end 54—2 of each inner raceway member 53—2 extends beyond the adjacent end of its spacer and mounting ring 50—2, and each inner raceway member end 54—2 has an outwardly facing raceway surface 55—2 formed thereon, which as illustrated is frusto-conical for use in conjunction with tapered or frusto-conical rolling members 56—2, with the large end of the frusto-conical raceway surface 55—2 being located nearest the spacing and mounting ring 50—2.

A thrust ring 57—2 may be interposed between the large end of each raceway surface 55—2 and the spacing and mounting collar 50—2, each thrust ring 57—2 being adapted for resisting the thrust of the large ends of the tapered rolling members 56—2.

A rolling member retaining shoulder 58—2 is preferably provided on each inner raceway member end 54—2, each shoulder 58—2 extending outwardly from the smaller end of the outer frusto-conical raceway surface 55—2 formed on the particular inner raceway member 53—2.

Each bearing 32—2 thus comprises an outer raceway member 63—2, having an inwardly facing raceway surface 64—2 formed therein, an inner raceway member 53—2 having an outwardly facing raceway surface 55—2 formed thereon, and tapered rolling members 56—2 interposed between and rolling on the raceway surfaces.

The outer end of each outer sleeve bore 46 is preferably provided with threads 65 which has screwed therein a threaded adjusting and retaining ring 66, the inner face of which abuts against the outer face of the spacer and mounting ring 50—2, whereby simultaneous adjustment of both bearings 32—2 and 32—1 may be effected.

By the foregoing construction and arrangement of each unit 16, the inner and outer raceway members, the thrust rings, and the rolling members may be made in the usual manner of hardened and ground alloy steel, and the remaining parts of the unit may be made of machinery steel.

Moreover, by the foregoing construction and arrangement, the several parts of each unit 16 are easily assembled and disassembled.

In the improved railway truck 10 including the improved units 16 as aforesaid, the load imposed upon each box 18 through the load sustaining members 17 to which the box is connected, is transmitted first to the inner raceway members mounted in the box as aforesaid, and then from the inner raceway members through the rolling members to the outer raceway members mounted on the axle as aforesaid, and the transmission of the load through the rolling members is effected solely at locations between the axis of rotation of the axle and the rails, as is very clearly illustrated in all of the several views, and is particularly illustrated and indicated in Figs. 1 and 2.

In each bearing unit 16, the outer sleeve 30 mounting as aforesaid the inner raceway members 52—1 and 52—2 constitutes a load transmitting member which has imposed thereon its proportionate amount of the total car load from the box housing 18 mounting the particular unit 16, which in turn is secured to the car truck frame; and each outer sleeve 30 with its inner raceway members mounted therein is so engaged with the box housing, that it may properly be termed a non-rotatable load transmitting member having raceways facing outwardly only thereon.

Similarly, the inner sleeve 31 of each bearing unit 16 mounting as aforesaid the outer raceway members 63—1 and 63—2 and being secured as aforesaid on one of the wheel supported shafts or axles 13, constitutes a rotatable load supporting member within the load transmitting member and having raceways facing inwardly only therein and opposed to the outwardly facing raceways of the load transmitting member, and the rolling members of each unit 16 are interposed and roll between the opposing raceways, and by this particular construction and arrangement is attained the desired imposition of the load upon the rolling members between the axis of rotation of the axle or shaft and the rails, or in other words at one side only of the axis of rotation of the bearing unit.

I claim:

1. An anti-friction bearing including a non-rotatable load transmitting member having a raceway facing outwardly only thereon, a rotatable load supporting member within the load transmitting member and having a raceway facing inwardly only therein, and rolling members interposed and rolling between the raceways, whereby the load is imposed upon the rolling members at one side only of the rotary axis of the bearing.

2. An anti-friction bearing including a non-rotatable load transmitting member having raceways facing outwardly only thereon, a rotatable load supporting member within the load transmitting member and having raceways facing inwardly only therein and opposed to the outwardly facing raceways, and rolling members interposed and rolling between opposing raceways, whereby the load is imposed upon the rolling members at one side only of the axis of rotation of the bearing.

3. An anti-friction bearing including a non-rotatable load transmitting member having a raceway facing outwardly only thereon, rotatable load supporting members including a shaft extending within the load transmitting member and a track riding wheel on the shaft, said shaft having a raceway facing inwardly only thereon and rolling members interposed and rolling between the raceways, whereby the load is imposed upon the rolling members at the track side only of the shaft.

4. An anti-friction bearing including a non-rotatable load transmitting member having raceways facing outwardly only thereon, a rotatable load supporting member including a shaft extending within the load transmitting member and a track riding wheel on the shaft, said shaft having raceways facing inwardly only thereon and opposed to the outwardly facing raceways, and rolling members interposed and rolling between opposing raceways, whereby the load is imposed upon the rolling members at the track side only of the shaft.

5. Anti-friction bearing apparatus including a load transmitting member, an anti-friction bearing, and a rotatable load supporting axle, the anti-friction bearing including an inner member having a raceway facing outwardly only thereon, an outer member having a raceway facing inwardly only therein, and rolling members interposed and rolling between the raceways, and the inner bearing member being engaged by the load transmitting member, and the outer bearing member being mounted on the axle, whereby the load is imposed upon the rolling members at one side only of the axle.

6. Apparatus for railway cars and the like including a wheel adapted to roll on a track or the like, a shaft on the wheel, and an anti-friction bearing, the anti-friction bearing including a non-rotatable load transmitting member having a raceway facing outwardly only thereon, a rotatable load supporting member located within the load transmitting member and on the shaft, the load supporting member having a raceway facing inwardly only therein, and rolling members interposed and rolling between the raceways, whereby the load is imposed upon the rolling members at the track side only of the shaft.

7. Apparatus for railway cars and the like, including a wheel adapted to roll on a track or the like, a shaft on the wheel, and an anti-friction bearing, the anti-friction bearing including a non-rotatable load transmitting member having raceways facing outwardly only thereon, a rotatable load supporting member located within the load transmitting member and on the shaft, the load supporting member having raceways facing inwardly only therein and opposed to the outwardly facing raceways, and rolling members interposed and rolling between opposed raceways, whereby the load is imposed upon the rolling members at the track side only of the shaft.

FRANK TYSON.